United States Patent
Dunkin

[11] 3,800,348
[45] Apr. 2, 1974

[54] METHOD AND APPARATUS FOR CUTTING AND INSERTING BLANKS FROM A ROD
[75] Inventor: Albert Dunkin, South Norwalk, Conn.
[73] Assignee: Raybestos-Manhattan, Inc., Bridgeport, Conn.
[22] Filed: Nov. 10, 1972
[21] Appl. No.: 305,423

[52] U.S. Cl. ............................................. 10/11 T
[51] Int. Cl. .......................... B21k 1/44, B21k 1/58
[58] Field of Search ............ 10/2, 10 R, 11 T, 12 T, 10/13, 24, 26, 27 R

[56] References Cited
UNITED STATES PATENTS
2,395,722   2/1946   Buchet .................................. 10/13
3,551,926   1/1971   Ferre ..................................... 10/13
2,664,579   1/1954   Akey ..................................... 10/13

FOREIGN PATENTS OR APPLICATIONS
1,268   1/1904   Great Britain ......................... 10/13

Primary Examiner—Charles W. Lanham
Assistant Examiner—E. M. Combs
Attorney, Agent, or Firm—Ernest M. Junkins

[57] ABSTRACT

A method and apparatus for rapidly cutting a rod into individual blanks having a constant precise length and inserting each blank into one of a plurality of holders carried by a transfer mechanism. The rod is partially advanced and then cut to form the blank while the transfer mechanism is being indexed to position the next holder to receive a blank with a surface of the transfer mechanism being used to size the blank to an accurate length. The time for the holder to be maintained stationary is thus only limited to the time necessary for advancing the rod a length that is no greater than the length of the blank.

13 Claims, 9 Drawing Figures

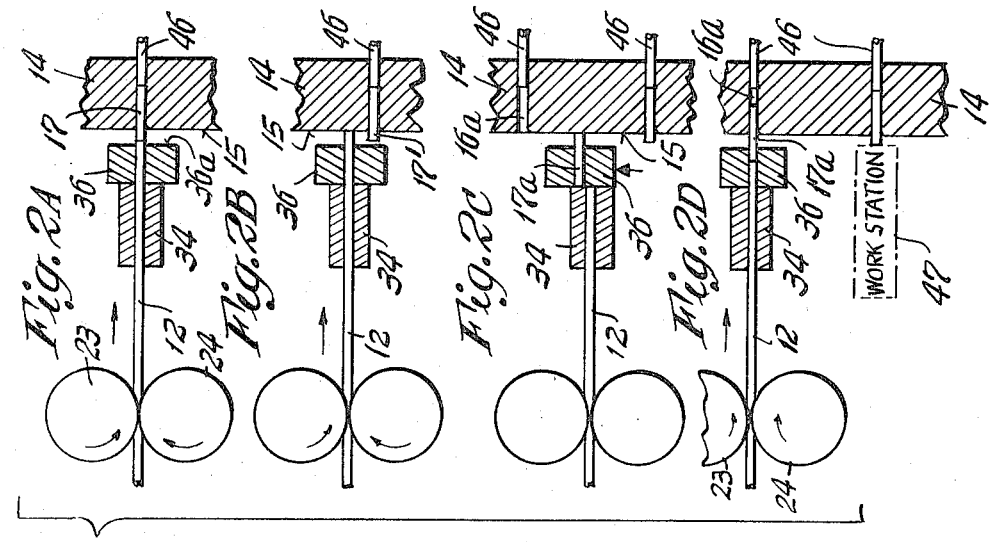
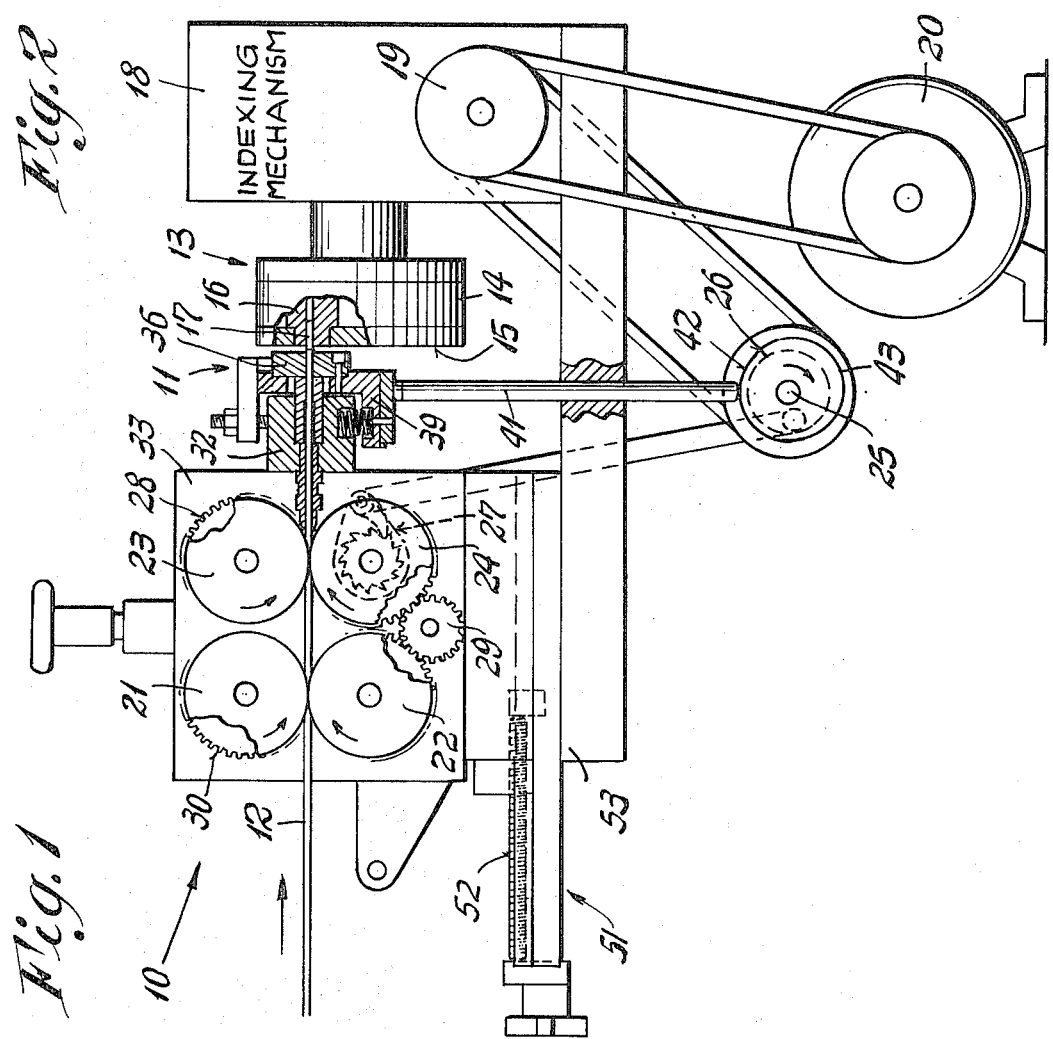

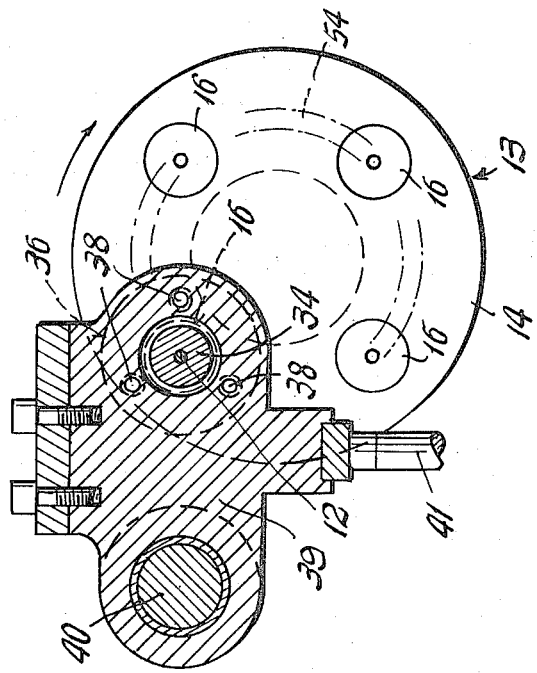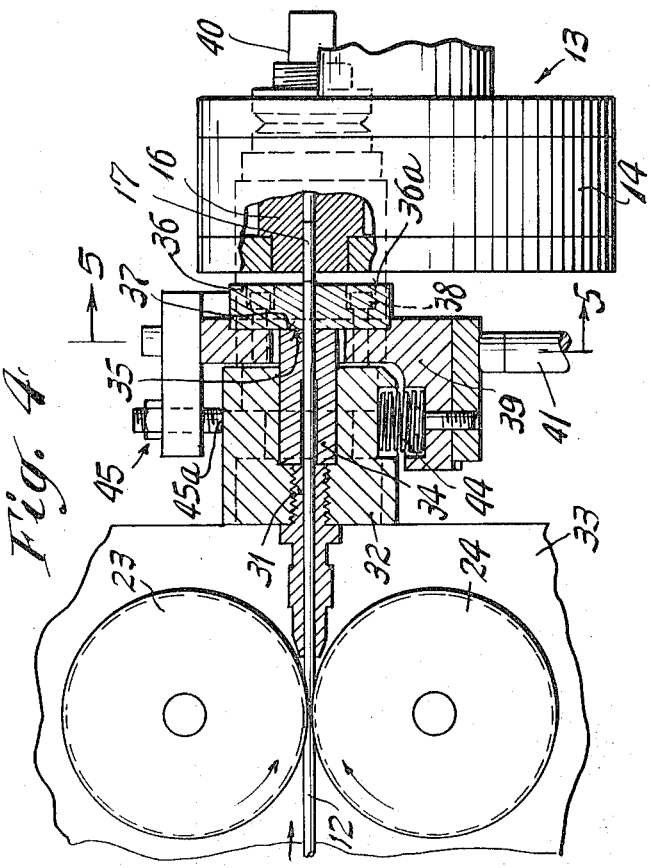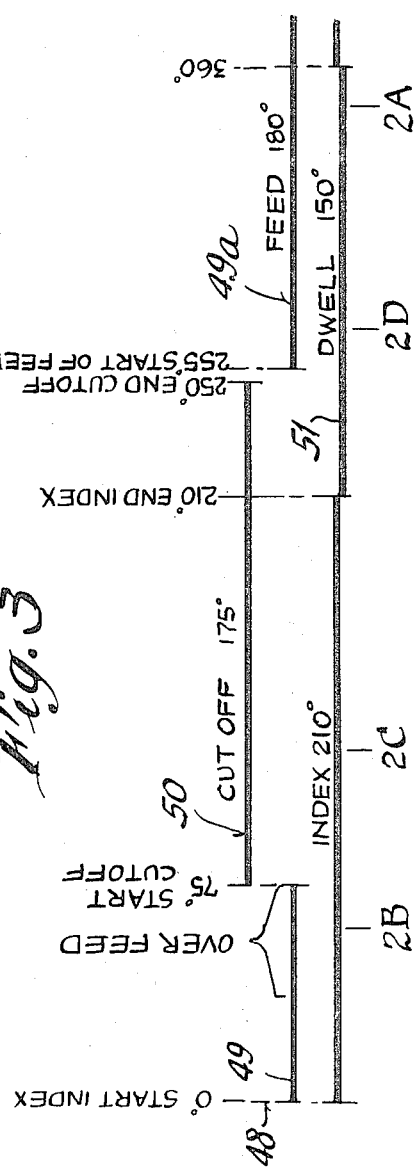

METHOD AND APPARATUS FOR CUTTING AND INSERTING BLANKS FROM A ROD

The present invention has particular utility in the making of shaped articles such as screws, rivets or the like in which a cylindrical blank is cut from an elongate rod and is formed or otherwise mechanically worked into an article having the desired final shape. Such machines normally have a plurality of spaced apart work stations at which tools are positioned for performing the work operations on each blank and the blank is sequentially transferred from one work station to another by a transfer mechanism. The transfer mechanism has a plurality of holders with a blank being adapted to be positioned with each holder. The work stations are spaced to be in alignment with the path movement of the holders so that the transfer mechanism moves to sequentially present each holder carrying a blank at each of the work positions. The transfer mechanism stops at the work station for the time necessary for all the operations to be performed before indexing or incrementally moving to again present the next holder at each work station.

The time that the transfer mechanism is stopped is called the dwell time and the duration of the dwell time is set by the time for the longest operation to be performed. One of the operations at a work station had consisted of positioning a blank in a holder by first inserting the end portion of an elongate rod into the holder and then cutting the rod to separate the end portion or blank therefrom. Such a loading operation has been found to normally require the longest duration of any of the operations at the work station and hence sets the minimum duration of the dwell time. This limits the rate at which the transfer mechanism may move and hence the number of articles that may be made in a selected time period. Moreover, attempts to decrease the duration of the feeding, cutting and loading operations have not been completely successful with one of the deficiencies being in the inability to maintain a precise length of the blank.

It is accordingly an object of the present invention to increase the rate at which blanks may be formed into the desired articles by decreasing the duration during the dwell period of the time required for the cutting and inserting of a blank into a holder of a transfer mechanism.

Another object of the present invention is to achieve the above object by a method and apparatus which performs a portion of the feeding and all of the cutting of a blank from an elongate rod while the transfer mechanism is moving rather than performing all of these operations during the dwell period.

A further object of the present invention is to provide a method and apparatus which enables blanks to be cut from an elongate rod and inserted into a holder at an increased rate but yet in which each blank is not only cut to a constant precise length but is also accurately positioned within the holder.

Still another object of the present invention is to achieve the above objects with an apparatus that is relatively simple in design, durable in construction and reliable in use.

The feature of the present invention resides in the method and apparatus by which some of the time required for cutting a blank from a rod and inserting it into a holder occurs while the transfer mechanism is indexing to move a blank loaded holder from a loading station and bring the next successive empty holder to the loading station. This is achieved by the following sequence for each blank wherein after a blank has been loaded into a holder, the transfer mechanism begins indexing the holder and during this movement, the elongate rod is advanced a length that enables it to be severed between a stationary and a movable surface. The blank is then brought into alignment with the end of the rod such that when the next empty holder is positioned at the loading station the rod is advanced to push the blank into the empty holder. Thus, the time required for the cutting and loading operation is only that time required for the rod to advance to cut a blank into the holder rather than for all the cutting and advancing operations.

Other features and advantages will hereinafter appear.

In the drawing:

FIG. 1 is a side view of the apparatus of the present invention with portions broken away to show details of construction.

FIG. 2 consists of four diagrammatic representations (2A through 2D) of the relationships at the loading station between the various parts that exist for the inserting of a blank.

FIG. 3 is a timing chart showing the time relation of each of the operations for the cutting and inserting of one blank.

FIG. 4 is an enlarged view, partly in section of the loading station in the apparatus of the present invention.

FIG. 5 is a section taken on line 5—5 of FIG. 4.

Referring to the drawing, the apparatus of the present invention is generally indicated by the reference numeral 10 and includes a loading station 11 through which an elongate rod 12 is advanced and cut to be inserted into a mechanism 13. While the transfer mechanism may be of any conventional construction that supports and sequentially indexes holders to work stations, in the embodiment herein shown it consists of a rotatable index wheel 14 having a surface 15 and a plurality of equal spaced holders 16. There are four holders symmetrically located on the wheel 14, though a different number may be employed if desired. There is, however, at least a holder for each work station which includes a loading station and an ejection station.

Each holder is caused to be moved to successive work stations by the index wheel being indexed and then dwelling in alignment with the work stations to have each of the holders presented sequentially to the work stations. At each of the work stations, operations may be performed on a blank 17 in each holder to cause it to have the final desired shape with such tools not being shown here. Each holder 16 is shown herein merely as an aperture which closely mates with its blank 17 as the shape of such holders is not material to the present invention other than to be able to receive and hold each blank for shaping into the final shape of the workpiece.

The indexing wheel is shown connected to an indexing mechanism 18 which receives power by a pulley 19 from a motor 20. The indexing mechanism 18 for each revolution of the pulley 19 will cause the index wheel to move the holders from one station to the next and remain at that station for the dwell time which is not less than the time required for the longest operation.

The indexing wheel is shown in FIG. 1 at its dwell position so that a holder 16 is at the loading station 11.

The elongate rod 12 is moved towards the index wheel by an advancing means that includes a first pair of feed rolls 21 and 22 and a second pair of feed rolls 23 and 24 with the periphery of the wheels being such as to mate with the periphery of the rod 12 as it passes therebetween. A shaft 25 is driven in timed relation to the pulley 19 on a 1—1 ratio as by a chain or toothed belt, and carries an eccentric 26 which incrementally operates a pawl and ratchet 27 for rotating the feed roll 24. The motion of the roll 24 is transmitted as by gearing 28 to roll 23 and by an idler gear 29 to roll 22 which drives feed roll 21 by gearing 30. The same incremental movement of the feed roll 24 is thus imparted to the other three feed rolls.

The rod 12, as shown in FIG. 4 exits from the feed wheels 23 and 24 into a passageway 31 formed in a support 32 that is fast on a base 33 which also supports the feed rolls. The passageway is formed in a tubular member 34 having a substantially perpendicular edge 35 and in a cutting disk 36 having an adjacent perpendicular edge 37. The disk 36 is secured as by screws 38 to an arm 39 that is mounted for pivotal movement on a pivot 40 carried by the support 32.

The passageway portion defined by the member 34 and disk 36 are normally aligned such that the rod 12 may pass uninterruptedly through the passageway 31 to exit from the disk 36, to cut or sever the rod into a blank, the arm 39 is pivoted which displaces the disk 36 with respect to the member 34 to cause severing between the two edges 35 and 37. The pivoting motion is effected by means of a cam follower rod 41 that has one end that bears against the arm 39 while its other end engages the peripheral surface of a cam 42 that has a high spot 43. The cam 42 is mounted on the shaft 25 to be rotated in time relation with the indexing wheel 14 and the feed rolls. The high spot 43 pivots the arm 39 upwardly in FIG. 5 a distance which is sufficient to effect the shearing of a blank from the rod and may, for example, be one-fifth to one-third the diameter of the rod when the passageway completely encloses the rod. The pivotal movement caused by the follower rod 41 is opposed by a spring 44 which continually urges the arm 39 against the rod 41 and thus the rod 41 against the cam 42. For assuring that the passageway in the disk will be in alignment with the passageway in the member 35, the arm includes an adjustable stop 45 which abuts, as at 45a, the support 32.

Shown in FIG. 2 are four diagrammatic representations of the relative locations of the parts at the loading station for different times during one cycle of cutting and inserting a blank into a holder. In FIG. 2A, the parts are positioned as they would be towards the end of the dwell time with a blank 17 positioned within the holder. An advancing movement of the rod 12 pushes the blank into the holder until the end of the blank abuts a stop 46 in the holder. The stop may also serve as an ejector pin for the holder and hence be movable if desired. If the blank 17 is to be headed, it may have a portion 17' extend outwardly beyond the face 15 of the index wheel.

The index wheel 14 then begins indexing to position the next empty holder 16a at the loading station in alignment with the rod 12 and the feed rolls 23 and 24 are incrementally moved to advance the rod until the end thereof abuts the surface 15 of the index wheel as shown in FIG. 2B. The index wheel continues to move to bring the holder 16a to the loading station, and as shown in FIG. 2C, during this indexing, the cam 42 causes pivoting of the arm 39 to effect severing of the next blank 17a. Further movement of the indexing mechanism will again position for the dwell time the holder 16a in alignment with the rod 12 and the blank 17a in the disk 36 at the loading station. The feed wheels are then caused to move to advance the rod 12 which pushes the blank 17a into the holder 16a as shown in FIG. 2D. During this dwell time the holder 16 may be located at a work station 47 to have forming operations on the blank 17. The cycle is completed when the blank 17 has been completely positioned within the holder 16a such as shown in FIG. 2A.

FIG. 3 shows a chart of the movement for one cycle of the parts with the chart having as a base 360° which corresponds to one revolution of the pulley 19 and shaft 25. The various positions during the cycle in which parts are as shown in FIGS. 2A and 2D are approximately indicated. The cycle begins as at 48 (0°) with the initiation of the indexing of the wheel 14 for a duration of perhaps 210° and for the early part thereof shown by the "feed" line 49, the feed rollers are advancing the rod until the end of the rod abuts the face 15 as shown in FIG. 2B. However, the feed rolls continue to attempt to advance the rod for the remaining portion indicated "overfeed" in order to assure that the end of the rod is maintained against the face 15. As the feed rolls only frictionally engage the rod, slippage may thus occur but still, by moving the feed rolls, an advancing force is maintained on the rod to assure an accurate length of the blank.

The cutting motion is indicated by the line 50 denoted "cut-off" and it begins after the feed rollers are stopped to continue for approximately 175°. The indexing stops after approximately 210° and the dwell time 51 then begins to extend for the remaining 150° of the cycle so that at least in this embodiment, the duration for indexing exceeds the dwell time. About 5° after the end of the cutting motion, the feed rolls are actuated as indicated by the line 49a to advance the rod to push the severed blank into the holder 16. The feeding motion continues to the end of the dwell cycle and into the beginning of the next cycle as indicated by the line 49.

It will thus be understood that the "overfeed" motion assures that the end of the rod will be against the face 15 on the index wheel to have the length of the rod between the face 15 and the junction of the cutting edges 35 and 37 remain constant for each blank so that each blank will accordingly be cut very precisely to length. Overfeeding may also occur when the rod has pushed the blank into the holder to engage the stop 46 to assure that the blank is inserted completely into the holder to assure both its retainance therein and clearance between the end of the blank and the adjacent surface of the disk.

While the cut-off time shown in FIG. 3 extends slightly beyond the termination of the index and the beginning of the dwell time its extent into the dwell time is minute and less than the dwell time required by the other operations. Moreover, it will be appreciated that it may be shortened to occur just within the index time as the portion thereof in the dwell time is only the returning of the disk 36 to have the blank aligned with the rod.

The distance between the surface 15 of the index wheel and the adjacent surface 36a of the disk sets the maximum portion of the blank that may project from the face 15, with the difference being preferably only a clearance dimension such as a few thousandths of an inch. Thus the present invention does not require that the rod be advanced the complete length of the blank during the dwell time as the projecting portion is advanced during the indexing time.

For precisely adjusting the length of the blank, the base 33 is mounted on a dovetail slide 51 that is movable by means of a threaded rod 52 on a frame 53. Movement of the threaded rod 52 alters the distance between the junction of the cutting edges 35 and 37 and the surface 15 to precisely set the length of the blank.

The end of the rod when engaging the surface 15 may require that the surface, at least in the area indicated by the dotted lines 54 (FIG. 5) be formed of hardened material to resist abrasion.

It will accordingly be understood that there has been disclosed a method and apparatus for cutting a blank from a rod and inserting it into a holder which minimizes the time that the holder is required to be maintained stationary or dwell. This is achieved by performing the step of cutting the rod to form the blank while the next successive holder is being moved to have the blank inserted therein. Additionally, the rod is advanced to precisely the size of the blank during indexing by utilizing the flat surface of the index wheel which carries the holder. Thus, the only operation performed during the dwell time is the advancing of the rod to push the blank into the holder with the rod movement required normally being less than the length of the blank.

Variations and modifications may be made within the scope of the invention and portions of the improvements may be used without others.

I claim:

1. The method of cutting blanks from an elongate rod and inserting each blank into a holder with each holder being sequentially positioned to be loaded with a blank comprising for each blank the sequential steps of moving a holder having a blank from a loading position, advancing the rod a selected length and cutting the rod to form a blank while the next holder is being moved into the loading position, stopping the next holder in alignment with the blank at the loading position and advancing the rod to push the blank into the empty holder while the holder is at the loading position.

2. The invention as defined in claim 1 in which the holders are carried by a transfer mechanism having a surface transverse to the rod movement between adjacent holders and in which the step of advancing the rod a selected length includes advancing the rod until its end abuts the surface.

3. The invention as defined in claim 2 in which the step of advancing the rod includes maintaining an advancing force on the rod to assure abutment.

4. The invention as defined in claim 1 in which each holder has a stop engageable by the blank and in which the step of advancing to push the blank into the holder includes moving the rod until the blank abuts the stop and maintaining an advancing force on the rod.

5. The invention as defined in claim 1 in which the step of advancing the rod causes the end thereof to abut against a surface and in which the step of cutting includes severing the rod at a location which is spaced from the surface a distance which substantially equals the desired length of the blank while the end of the rod is abutting the surface.

6. An apparatus for cutting a blank from an elongate rod and inserting each blank into a holder comprising a transfer mechanism having a plurality of holders, means for moving the transfer mechanism to have each holder sequentially positioned at a loading station, means forming a passageway aligned with the loading station and in which a rod is adapted to be positioned, means for transversely displacing a portion of the passageway means to sever the rod to produce a blank while the rod is free of a holder and means for advancing the rod while a holder is positioned at the loading station to push the blank into the holder.

7. The invention as defined in claim 6 in which the displacing portion of the passageway is the portion of the passageway means located nearest the holder.

8. The invention as defined in claim 6 in which the transfer mechanism has a surface between each holder transverse to the passageway, the passageway means has a junction between the displacing portion and the remainder of the passageway means and in which the distance from the surface to the junction is set to substantially equal the length of the blank.

9. The invention as defined in claim 8 in which there are means for adjusting the distance between the junction and the surface to thereby enable the length of the blank to be changed.

10. The invention as defined in claim 8 in which the means for advancing the rod also advances the rod to effect abutment of the rod end against the surface.

11. The invention as defined in claim 6 in which there are means interrelating the transfer mechanism moving means and the passageway displacing means to effect substantially all displacing of the means with movement of the transfer mechanism.

12. The invention as defined in claim 6 in which each holder includes a stop, in which the rod advancing means pushes the blank against the stop and in which the rod advancing means maintains an advancing force on the rod while the blank is against the stop.

13. The invention as defined in claim 6 in which the transfer mechanism has a surface transverse to the passageway between adjacent holders and in which the rod advancing means advances the end of the rod against the surface and subsequently maintains the end thereat by exerting an advancing force on the rod.

* * * * *